C. A. SAMPSON.
WIRE BASE MOUSE TRAP.
APPLICATION FILED JAN. 15, 1915.
1,217,073.
Patented Feb. 20, 1917.
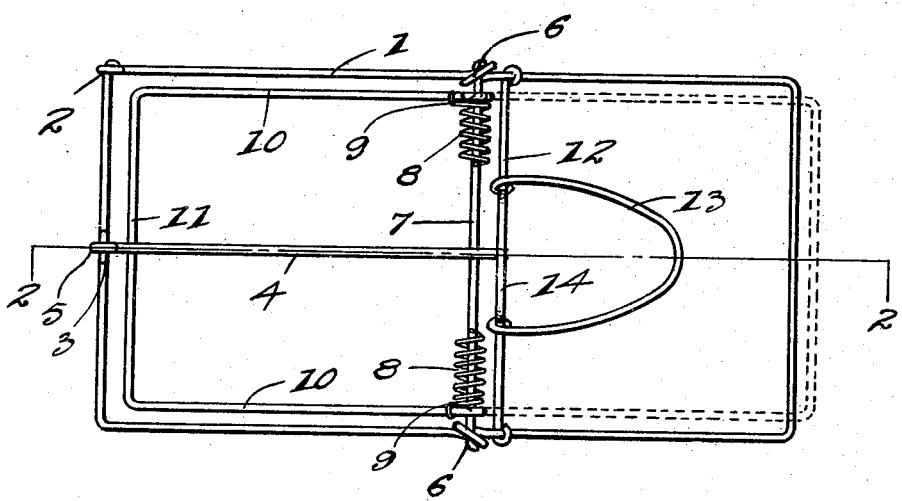
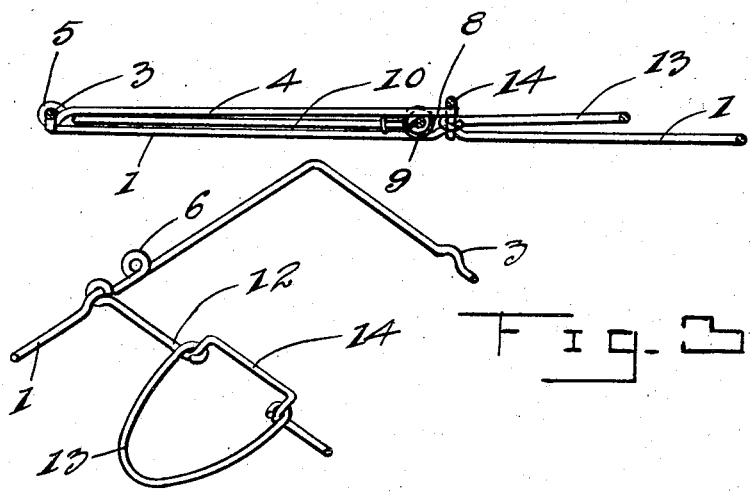
Witnesses
Inventor
C. A. Sampson,
By
Attorney

UNITED STATES PATENT OFFICE.

CHARLES A. SAMPSON, OF RADCLIFFE, IOWA.

WIRE-BASE MOUSE-TRAP.

1,217,073. Specification of Letters Patent. Patented Feb. 20, 1917.

Application filed January 15, 1915. Serial No. 2,398.

*To all whom it may concern:*

Be it known that I, CHARLES A. SAMPSON, a citizen of the United States, residing at Radcliffe, in the county of Hardin and State of Iowa, have invented certain new and useful Improvements in Wire-Base Mouse-Traps; and I do hereby declare the following to be a full, clear, and exact description of the invention, such as will enable others skilled in the art to which it appertains to make and use the same.

This invention relates to wire-base mouse traps, and one of the principal objects of the invention is to provide a mouse trap made entirely of wire, thus eliminating the necessity for using a wooden base and connecting certain wires to said base, the result being that the trap is more substantial, and less expensive to manufacture.

The foregoing and other objects may be attained by means of the construction illustrated in the accompanying drawing, in which, Figure 1 is a top plan view of a mouse trap made in accordance with this invention, and shown in set condition in full lines, in sprung condition in dotted lines, Fig. 2 is a sectional view taken on the line 2—2 of Fig. 1, and Fig. 3 is a fragmentary perspective view of certain parts of the trap.

Referring to the drawing, the numeral 1 designates a rectangular wire frame preferably formed of a single piece and the two ends of the frame connected together at one corner as at 2. The frame 1 is provided with an upwardly bent trigger bearing 3 at one end, and a trigger 4 is connected thereto by means of a loop 5. In the side members of the frame 1 loops or rings 6 are formed and extending transversely across the frame with its ends rigidly secured in said rings 6 is a wire rod 7 having coil springs 8 near its ends. Pivotally connected to the rod 7 is the U-shaped jaw member of the trap comprising a piece of wire of the desired gage connected at 9 to the rod 7 and comprising the side bars or members 10 and the connecting end bar 11. The said springs 8 each having one of their ends connected to the side bars 10 of the jaw member and the other end to the rod 7.

Loosely mounted to the side members of the frame is a wire rod 12, said rod 12 having an offset portion 14 and rigidly secured on said offset portion 14 is the substantially U-shaped pan or bait holder 13.

The trap is set by moving the jaw or bail against the tension of the springs 8 and passing the trigger 4 over the end bar 11 and pulling upward on the bait holder 13 until the end of the trigger is engaged by the member 14 of the rod 12. A slight depression of the pan or bait holder 13 will move the portion 14 and release the trigger, and the bail will be thrown into the dotted line position shown in Fig. 1 to catch the mouse.

From the foregoing it will be obvious that a mouse trap made in accordance with this invention may be made entirely of wire, and will not require a wooden base, thus not only reducing the cost of manufacture but also rendering the device more substantial and adding extended life to the device. Another advantage of using wire entirely instead of wood, is that the same can be readily cleaned and the destruction of odors which would interfere with the successful operation of the trap removed.

Various changes in the details of construction may be resorted to without departing from the spirit and scope of the invention as defined in the claim.

What is claimed is:—

A trap comprising a rectangular frame constructed from a single length of wire, the side members of the frame being bent to form oppositely disposed loops, one of the end members of said frame being offset upwardly to form a trigger bearing, a trigger pivoted on said bearing, a transverse rod rigidly secured in said loops, a substantially U-shaped jaw having its ends pivoted to the rod adjacent each end, coil springs secured to the rod and to the arm portions of the jaw, a rod pivoted to the frame adjacent the first mentioned rod and having a substantially U-shaped offset portion to receive the free end of the trigger for holding the jaw against the tension of the springs, and a substantially U-shaped bait holder having its ends bent about the arm portion of the offset portion to rock the offset portion when pressure is applied thereon to free the jaw.

In testimony whereof I affix my signature in presence of two witnesses.

CHARLES A. SAMPSON.

Witnesses:
E. L. POREN,
JEWEL BOCKWITZ.

Copies of this patent may be obtained for five cents each, by addressing the "Commissioner of Patents, Washington, D. C."